(12) United States Patent
Chen et al.

(10) Patent No.: US 6,925,479 B2
(45) Date of Patent: Aug. 2, 2005

(54) GENERAL FINITE-FIELD MULTIPLIER AND METHOD OF THE SAME

(75) Inventors: Oscal Tzyh-Chiang Chen, Taipei (TW); Yuh-Feng Hsu, Chu Pei (TW)

(73) Assignee: Industrial Technology Research Institute, Hsinchu (TW)

( * ) Notice: Subject to any disclaimer, the term of this patent is extended or adjusted under 35 U.S.C. 154(b) by 793 days.

(21) Appl. No.: 09/843,802

(22) Filed: Apr. 30, 2001

(65) Prior Publication Data

US 2002/0184281 A1 Dec. 5, 2002

(51) Int. Cl.[7] .................................................. G06F 7/72
(52) U.S. Cl. ...................................................... 708/491
(58) Field of Search ................................ 708/491, 492

(56) References Cited

U.S. PATENT DOCUMENTS

| | | | | |
|---|---|---|---|---|
| 5,680,340 A | * | 10/1997 | Glover et al. ............... | 708/492 |
| 5,887,006 A | * | 3/1999 | Sharma ....................... | 714/784 |
| 6,178,436 B1 | * | 1/2001 | Blake et al. ................. | 708/492 |
| 6,343,305 B1 | * | 1/2002 | Koç et al. .................... | 708/492 |
| 6,389,442 B1 | * | 5/2002 | Yin et al. .................... | 708/492 |
| 6,701,336 B1 | * | 3/2004 | Shen et al. .................. | 708/492 |

* cited by examiner

Primary Examiner—D. H. Malzahn
(74) Attorney, Agent, or Firm—Bacon & Thomas, PLLC (57) ABSTRACT

A general finite-field multiplier and the method of the same are disclosed for the operation of the finite-field multipliers of various specifications. In the multiplier, AND gates and XOR gates are used as primary components, and the inputs include two elements A and B to be multiplied and the coefficients of a variable polynomial p(x). This multiplier can be applied to the finite-field elements of different bit number. After all the coefficients of the A, B and p(x) are input, the values of a desired C can be obtained rapidly. Since the output values are parallel output, the application is very convenient. Furthermore, the multiplier can be used in the RS chip for different specifications.

24 Claims, 6 Drawing Sheets

GENERAL FINITE-FIELD MULTIPLIER AND METHOD OF THE SAME

BACKGROUND OF THE INVENTION

1. Field of the Invention

The present invention relates to the field of finite-field multipliers, and more particularly, to a general finite-field multiplier and the method of the same.

2. Description of Related Art

A finite-field element is a value with a fixed bit number, for example, an element has four bits, and thus 16 values are possibly formed. Since in the encryption or error correction (such as Reed-Solomon code, abbreviated as RS code), signals are necessary to be coded so that the coded value can be represented by a mathematical polynomial p(x) and then a decoded operation can be used. Therefore, each fixed bit value must be given a representation symbol. Furthermore, the AND and XOR operations can be performed between these symbols for generating another symbols. For example, four bits are used as a symbol of an element. When AND or XOR operations are performed between different elements, at most only 16 results may be generated. Therefore, the set of these symbols having four bits can be used as a finite field. Through the operations of these elements in the finite field, the data can be encrypted or decrypted, and coded or decoded.

For the addition of two elements, it can be implemented by an XOR gate. However, to design the circuit for the multiplying operation of two elements is more complex. Conventionally, the multiplying operation is performed by a finite-field multiplier formed by, for example, a Berlekamp multiplier and two basis converters. This finite-field multiplier is known as a bit-serial multiplier. Therefore, the circuit structure is very simple. However, an obvious disadvantage is that the speed of multiplying is very slow. Moreover, the specification of p(x) is formed by a constant form, and thus, it can not be adjusted according to the practical requirement.

In order to avoid the problem in that the speed of the multiplier is too slow, a parallel construction may be used. This parallel multiplier primarily utilizes a Mastrovito finite-field multiplying operation, wherein one of two elements to be multiplied is at first converted to a matrix, and then vector-multiplied with the second element for generating a desired value. Therefore, the parallel multiplier is primarily formed by AND gates and XOR gates, and the components thereof are increased with the highest order of m. Therefore, the complexity of the hardware is $O(m^2)$.

Figure 6:
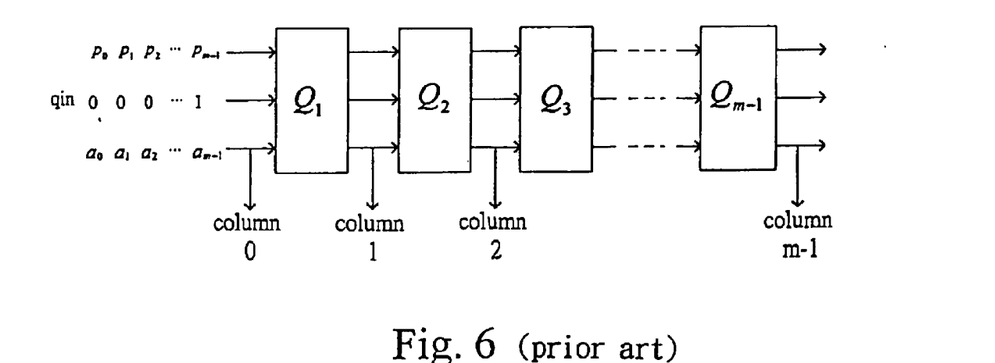
FIG. 6 is a matrix generator of a conventional Hasan finite-field multiplier.
Figure 7:
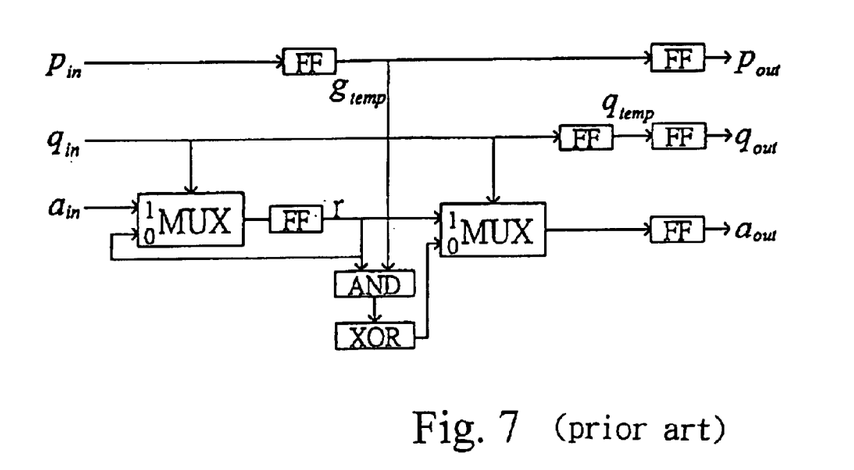
FIG. 7 shows the internal circuit structure of the combination component Q of Hasan finite-field multiplier illustrated in FIG. 6.
Figure 8:
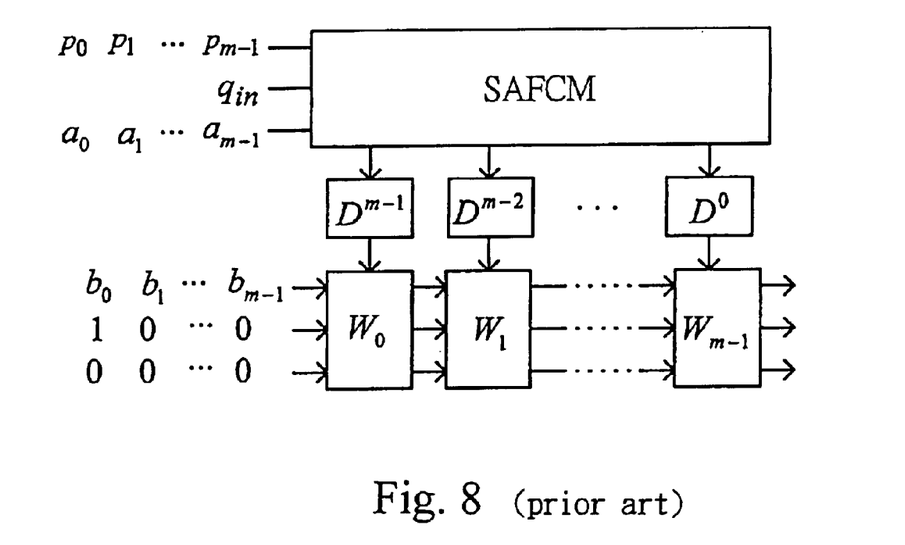
FIG. 8 shows a completed function module of the conventional Hasan finite-field multiplier.
Figure 9:
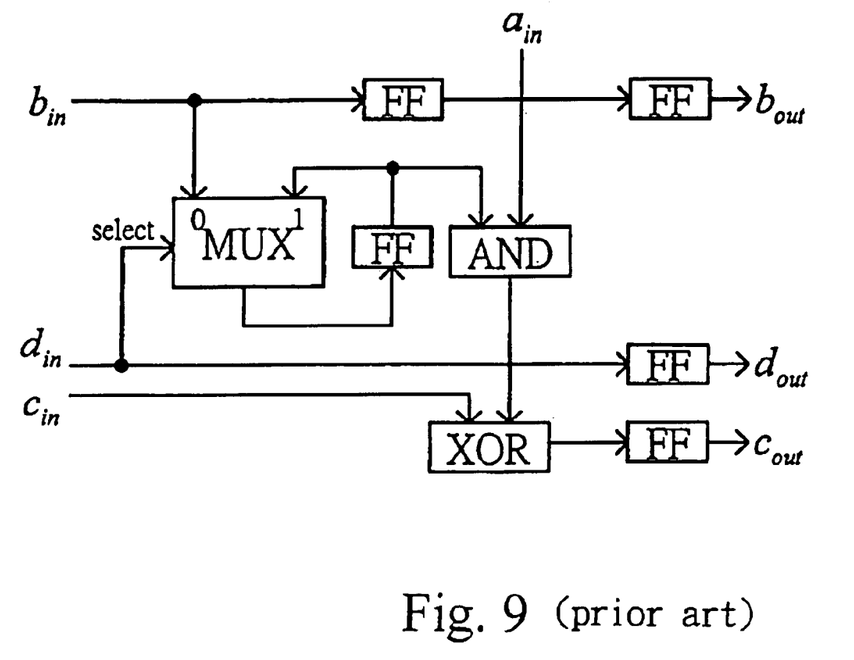
FIG. 9 is a circuit diagram of the internal components of a Hasan finite-field multiplier illustrated in FIG. 8.

As such, the finite-field multiplier is improved from the conventional bit-serial multiplier into a parallel multiplier. Most of the design specification of the multiplier is constant. When the specification of the p(x) is changed, the conventional constant-type p(x) can not be used. Therefore, Hasan disclosed an adjustable bit-serial systolic finite-field multiplier, wherein the p(x) is changeable. FIG. 6 shows a bit-serial systolic matrix generator of a finite-field element multiplier disclosed by Hasan, which is provided primarily for receiving an element $A=(a_0, a_1, \ldots a_{m-1})$ to generate a column vector for matrix operation, wherein columns 1~m-1 will generate the column vector of the matrix, while the p(x) is changeable and can control the bit number of an element. The circuit structure of a combination component Q in this multiplier is illustrated in FIG. 7. There are three input values, wherein $p_{in}$ is a series of coefficients input to the p(x). As the first bit value of the symbol is received, $q_{in}$ will input an 1, otherwise a 0, while $a_{in}$ will generate the operation value in the matrix. The operation of the circuit is listed in the following:

if $q_{in}=1$
then
$a_{out}=r$; $r=a_{in}$;
else
$g_{out}=g_{temp}$; $g_{temp}=g_{in}$;
$q_{out}=q_{temp}$; $q_{temp}=q_{in}$;

FIG. 8 shows a complete functional module of this multi-functional bit-serial multiplier. The circuit of the internal element W thereof is illustrated in FIG. 9. Therefore, in this multiplier, element Q is used as a synthetic circuit for embodying required values in the matrix operation, and then, together with the element W and several dozens of flip-flops, the circuit of the multiplier can be accomplished. However, this circuit is only suitable for a finite-field multiplier with a constant length. In comparing with the aforesaid conventional multiplier with a constant p(x), there are too many logic gates used. Therefore, the disadvantage is that a large latency is employed in the data output of the circuit.

In the aforementioned conventional bit-serial multiplier, as a bit value is received, the shifting and multiplying operations must be performed for generating a desired value. The time of shifting for a multiplying operation of two elements in the multiplier is related to the highest order of the p(x) or is related to the number of bits interpreting a symbol. When the highest order of p(X) becomes larger, although the conventional bit-serial multiplier has less logic gate delays, the output thereof is in a bit serial manner, which may cause a serious problem in the computation of a Reed-Solomon code algorithm. Therefore, it is desirable to provide an improved general finite-field multiplier device and the method of the same to mitigate and/or obviate the aforementioned problems.

SUMMARY OF THE INVENTION

The object of the present invention is to provide a general finite-field multiplier and the method of the same, wherein a programmable multi-bit input and a programmable multi-bit multiplying operation are used, so that it can be integrated with a conventional system to provide a high convenience and it can be used in the RS chip for different specifications.

In accordance with a first aspect of the present invention, there is provided a general finite-field multiplication method for performing A×B=C from finite-field elements A and B and a polynomial p(x) to obtain a finite-field element C. The method comprises: a step of generating a parallel column-based matrix vector for expanding A into a matrix form and sequentially generating each element in each column of said A matrix, wherein the elements have values of A, Aα, $A\alpha^2 \ldots A\alpha^{m-1}$, respectively; and a step of a parallel column-based vector multiplication operation for directly multiplying each element of each column of the matrix A, that is generated sequentially, with the vector B, and all the multiplication results are accumulated so as to acquire the vector C.

In accordance with a second aspect of the present invention, there is provided a general finite-field multiplication method for performing A×B=C from finite-field elements A and B and a polynomial p(x) to obtain a finite-field element C. The method comprises: a step of generating a parallel matrix vector for generating the values of the elements in all columns of said matrix A is at a time, wherein the values are $A, A\alpha, A\alpha^2 \ldots A\alpha^{m-1}$, respectively; and a step of parallel column-based vector multiplication operation for multiplying matrix A with said vector B when the matrix A is generated, so as to acquire the vector C.

In accordance with a third aspect of the present invention, there is provided a general finite-field multiplier for performing A×B=C from finite-field elements A and B and a polynomial p(x) to obtain a finite-field element C. The multiplier comprises: a parallel column-based matrix vector generator for expanding A into a matrix form and sequentially generating each element in each column of said A matrix, wherein the elements have values of $A, A\alpha, A\alpha^2 \ldots A\alpha^{m-1}$, respectively; and a parallel column-based vector multiplication operator for directly multiplying each element of each column of the matrix A, that is generated sequentially, with the vector B, and all the multiplication results are accumulated so as to acquire the vector C.

In accordance with a fourth aspect of the present invention, there is provided a general finite-field multiplier for performing A×B=C from finite-field elements A and B and a polynomial p(x) to obtain a finite-field element C. The multiplier comprises: a parallel matrix vector generator for generating the values of the elements in all columns of said matrix A is at a time, wherein the values are $A, A\alpha, A\alpha^2 \ldots A\alpha^{m-1}$, respectively; and a parallel vector multiplication operator for multiplying matrix A with said vector B when the matrix A is generated, so as to acquire the vector C.

Other objects, advantages, and novel features of the invention will become more apparent from the following detailed description when taken in conjunction with the accompanying drawings.

DETAILED DESCRIPTION OF THE PREFERRED EMBODIMENT

The general finite-field multiplier and the method of the same according to the present invention will be described in the following with reference to the finite-field multiplying operation of C=A*B mod p(x) illustrated in equation (1). Based on the parallel multiplier algorithm disclosed by Mastrovito, A is first expressed in a matrix form by the relation of each element with the p(x), and then matrix-multiplied with B so as to generate the value of matrix C.

$$\begin{aligned} C &= AB \bmod p(x) \\ &= b_0 A + b_1(A\alpha \bmod p(x)) + \\ &\quad b_2(A\alpha^2 \bmod p(x)) + \ldots + \\ &\quad b_{m-1}(A\alpha^{m-1} \bmod p(x)). \end{aligned} \quad (1)$$

It is known from equation (1) that when two finite-field elements are multiplied, at first, each bit in element A can be expanded through an XOR operation, and the expansion value is performed an AND operation with each bit in element B for generating the value of element C. Therefore, the form of the Mastrovito multiplier is related to a non-reducible polynomial p(x). Therefore, the matrix form expanded from the equation (1) is given as follows:

$$\alpha^m = p_{m-1}\alpha^{m-1} + p_{m-2}\alpha^{m-2} + \Lambda + p_{m-1}\alpha + 1 \quad (2)$$

$$\lfloor A \quad A_\alpha \quad \Lambda \quad A_\alpha^{m-1} \rfloor \cdot b = c \quad (3)$$

$$A\alpha^k = A^{(k)} = A^{(k-1)}\alpha \bmod p(x) \quad (4)$$

$$A^{(k)} = a_{m-1}^{(k-1)}\alpha^m + a_{m-2}^{(k-1)}\alpha^{m-1} + \Lambda + a_0^{(k-1)}\alpha \quad (5)$$

$$a_i^{(k)} = \begin{cases} a_{i-1}^{(k-1)} + a_{m-1}^{(k-1)} p_i & 1 \le i \le m-1 \\ a_{m-1}^{(k-1)}, & i = 0 \end{cases} \quad (6)$$

$$\begin{bmatrix} a_{m-1}^{(0)} & a_{m-1}^{(1)} & \Lambda & a_{m-1}^{(m-1)} \\ a_{m-2}^{(0)} & a_{m-2}^{(1)} & \Lambda & a_{m-2}^{(m-1)} \\ M & \Lambda & \Lambda & \Lambda \\ a_0^{(0)} & a_0^{(1)} & \Lambda & a_0^{(m-1)} \end{bmatrix} \begin{bmatrix} b_0 \\ b_1 \\ M \\ b_{m-1} \end{bmatrix} = \begin{bmatrix} c_{m-1} \\ c_{m-2} \\ M \\ c_0 \end{bmatrix} \quad (7)$$

Therefore, it is known that the primary principle of a parallel multiplier is to make one of two multiplied elements into a matrix form for being performed with a vector operation with the second element so as to generate a desired value. The matrix form is illustrated in equation (7). The equation (8) is a matrix form simplified according to an equation $p(x)=1+x+x^4$. The operation is A×B=C, where A, B and C are finite-field elements. Therefore, it is known that the primary circuit elements of the parallel multiplier are AND gates and XOR gates. With the increasing of the highest order of the p(x), i.e. the increasing of the value of m, the complexity of the hardware thereof is about $O(m^2)$.

$$\begin{bmatrix} a_3 & a_2 & a_1 & a_0+a_3 \\ a_2 & a_1 & a_0+a_3 & a_2+a_3 \\ a_1 & a_0+a_3 & a_2+a_3 & a_1+a_2 \\ a_0 & a_3 & a_2 & a_1 \end{bmatrix} \begin{bmatrix} b_0 \\ b_1 \\ b_2 \\ b_3 \end{bmatrix} = \begin{bmatrix} c_3 \\ c_2 \\ c_1 \\ c_0 \end{bmatrix} \quad (8)$$

According to Mastrovito multiplier equation (7), it is known that the vector in the second column vector is generated from various p(x)'s and first column vector. The other column vectors can be obtained in the same manner, and thus the values in the matrix of equation (7) can be generated. Therefore, a multiplier designed in a serial connection manner can effectively reduce the cost and area thereof, while the operation speed will be slowed down. Therefore, in the present invention, the parallel operation in VLSI implementation is employed to quickly obtain the result of the multiplication of two finite-field elements.

According to equation (6), each column matrix in equation (7) can be derived by the values of the previous column and the coefficients of p(x). The equation (6) is simplified to have the equation (9). From equation (9), the vector values of each column can be obtained. From equation (9), it is known that the values of the k-th column are only related to the (k-1)-th column and the coefficient of the p(x). In the relation, the (k-1)-th column must be at first shifted. Then, the shifted last bit value $a_{m-1}^{(k-1)}$ and p(x) are AND-ed, and the result is XOR-ed with a displaced value for generating a matrix of the k-th column. The relation is illustrated in equation (9).

$$a_0^{(k)} = a_{m-1}^{(k-1)} \quad (9)$$
$$a_1^{(k)} = a_0^{(k-1)} + a_{m-1}^{(k-1)} p_1$$
$$a_2^{(k)} = a_1^{(k-1)} + a_{m-1}^{(k-1)} p_2$$
$$M$$
$$a_{m-1}^{(k)} = a_{m-2}^{(k-1)} + a_{m-1}^{(k-1)} p_{m-1}$$

Based on the matrix A induced from equation (9), the primary principle, i.e. the features, among the columns can be known. Equation (10) shown the arrangement of matrix A. In brief, the relation of the first column and the second column is that the values of the second column is derived from the first column by shift each value in first column upwards through one element in the matrix. That is, the value of $A_{0,0}$ in the second column is shifted to the position of $A_{m-1,1}$ in the second column, while the values originally in $A_{1,0} \sim A_{m-1,0}$ are shifted one position to the positions of $A_{0,1} \sim A_{m-2,1}$ in the second column, respectively. Then, according to the coefficient of p(x), it is determined whether to add the value original in $A_{0,0}$ to $A_{0,1} \sim A_{m-2,1}$. When the coefficients of p(x) with respect to the $A_{0,1} \sim A_{m-2,1}$ are 1's, then values in $A_{0,0}$ $A_{0,1} \sim A_{m-2,1}$ are added thereon. For example, if the coefficient of p(x) at position $A_{0,1}$ is 1, then $A_{0,1} = A_{0,0} + A_{0,1}$, while the value at $A_{0,0}$ is placed at the position of $A_{m-1,1}$. Thus, the values of the second column are obtained. The same process is used to derive the relation between the second column and the third column, the relation between the third column and the fourth column, etc., until all the columns in the matrix are derived.

$$A = \begin{bmatrix} A_{0,0} & A_{0,1} & \Lambda & A_{0,m-1} \\ A_{1,0} & A_{1,1} & \Lambda & A_{1,m-1} \\ M & M & O & M \\ A_{m-1,0} & A_{m-1,1} & \Lambda & A_{m-1,m-1} \end{bmatrix} \quad (10)$$

Figure 1:
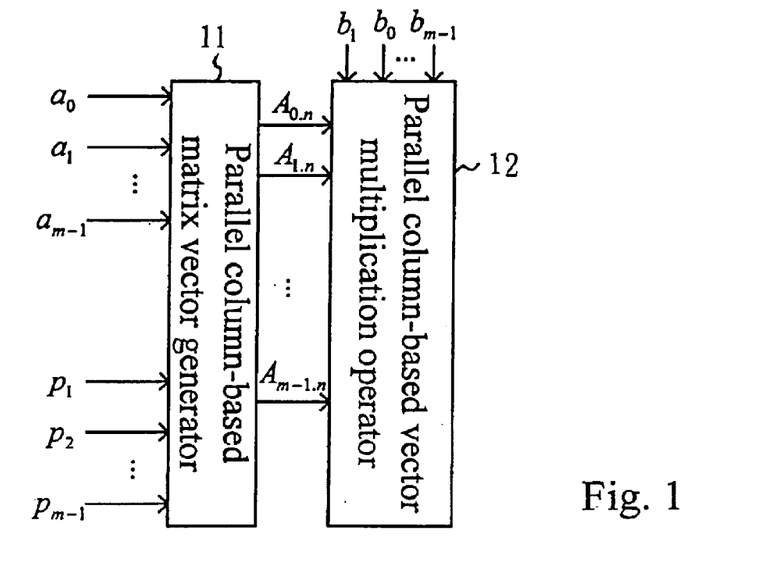
FIG. 1 shows a structure of a preferred embodiment of the finite-field multiplier according to the present invention.
Figure 2:
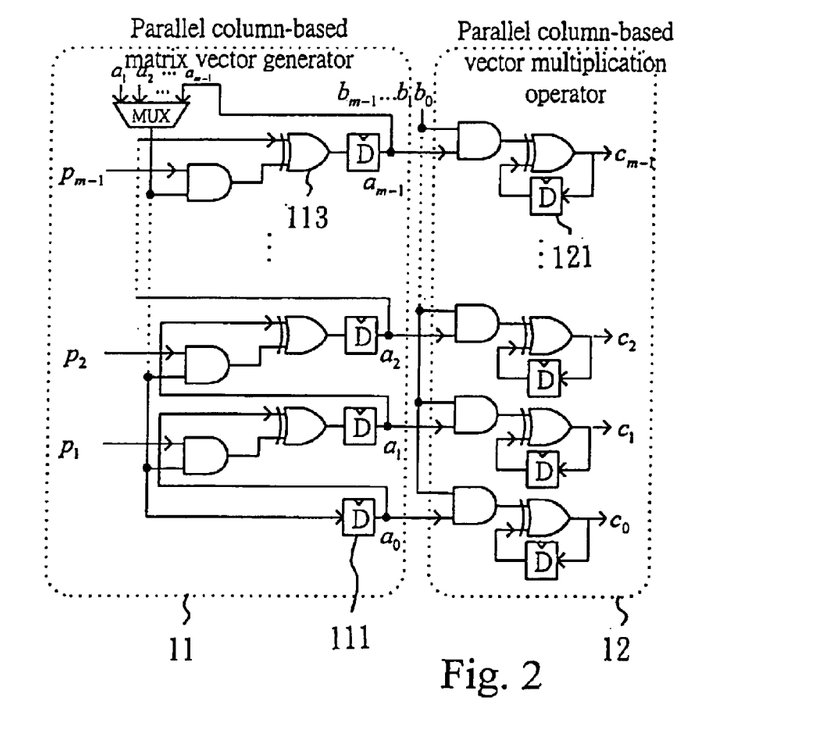
FIG. 2 shows a circuit of the finite-field multiplier illustrated in FIG. 1.

Therefore, the relations among the columns can be acquired from aforesaid description. Furthermore, from the multiplication equations of the finite-field elements, it is known that the vector multiplication operation must be used for the multiplying two elements. Therefore, the XOR gates and AND gates are required, and thus the circuit for the finite-field multiplier of the present invention is derived. Referring to FIG. 1, there is shown the structure of the finite-field multiplier according to a preferred embodiment of the present invention, which includes a parallel column-based matrix vector generator 11 and a parallel column-based vector multiplication operator 12. The circuit structure of the finite-field multiplier is illustrated in FIG. 2. Such a circuit is designed by utilizing equation (9), wherein the circuit component for generating the matrix A is the parallel column-based matrix vector generator 11, which has flip-flops 111 provided primarily for latching the elements in each column of the matrix A generated by the parallel column-based matrix vector generator 11. The multiplexer MUX is provided to decide which bit will be shifted out so as to determine the size of the matrix A. The AND gate is provided to determine whether the shifted value will be added to the elements of the next column. The multiplication operation is performed by the XOR gate 113. The generated column elements of the matrix A are then transferred to the parallel column-based vector multiplication operator 12. In this circuit, the flip-flop 121 is provided to latch the multiplying results of the elements in each column of the matrix A with the elements of the vector B. Then, the result is accumulated to the multiplying results of the elements in each column of the matrix A with the elements of the vector B. After m time of accumulating operations are performed, the desired vector C is generated. The circuit is characterized in that only one multiplexer is used to determine the bit for being shifted out. Therefore, the whole multiplication circuit is provided with a programmable bit number of the finite-field element, so that the number of bits generated in each column of the matrix A has a minimum of 2 and a maximum of m. Furthermore, the p(x) can be changed by an external input for matching the requirements of different specifications.

Figure 3:
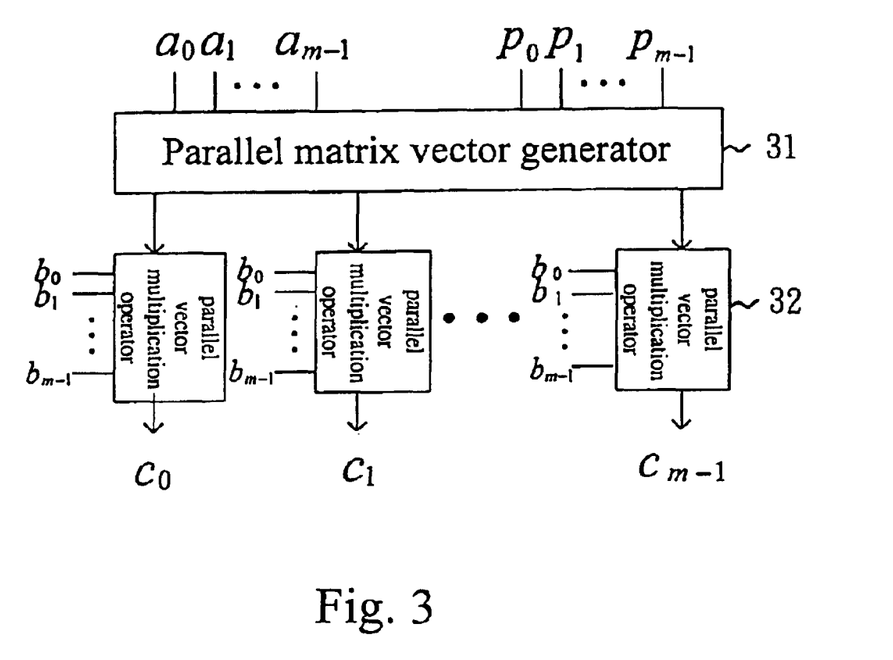
FIG. 3 shows a structure of another preferred embodiment of the finite-field multiplier according to the present invention.
Figure 4:
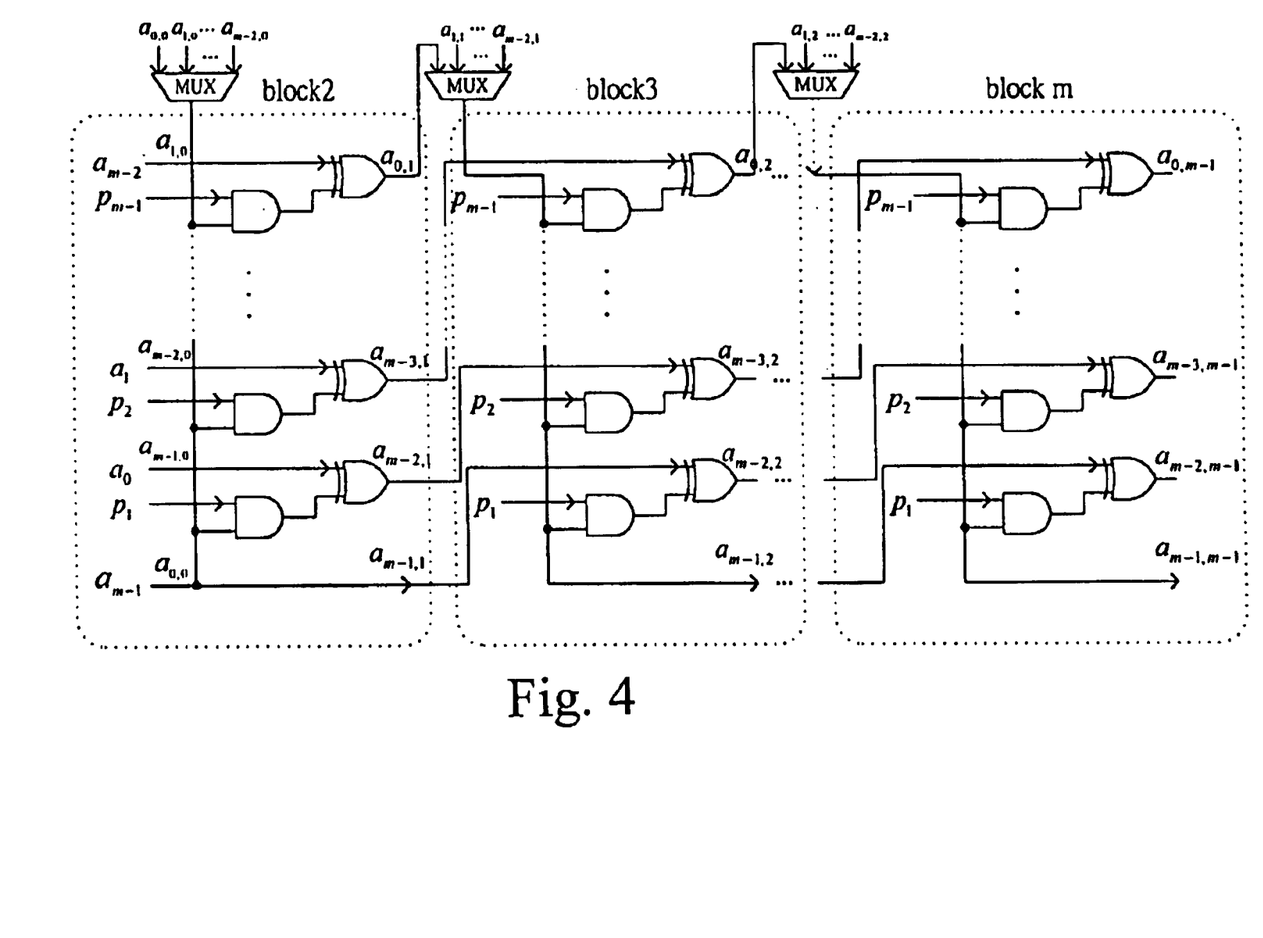
FIG. 4 is a circuit diagram of a parallel matrix vector generator illustrated in FIG. 3.
Figure 5:
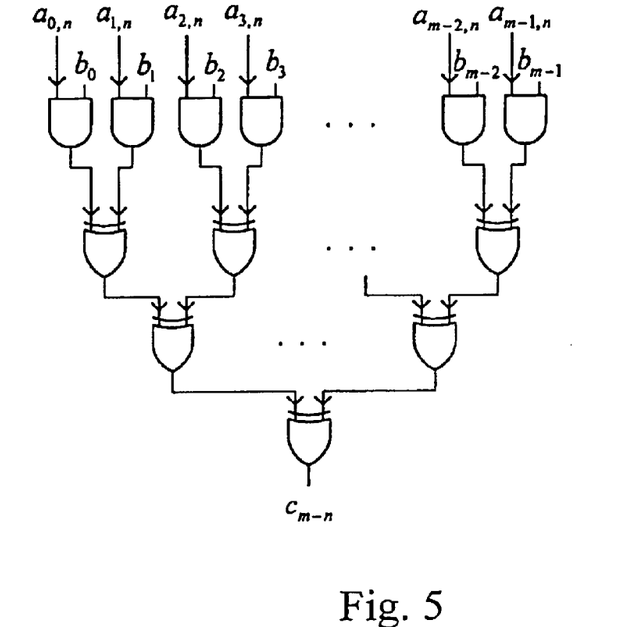
FIG. 5 is a circuit diagram of the parallel vector multiplication operator of the present invention.

FIG. 3 shows a structure of another preferred embodiment of the finite-field multiplier according to the present invention implemented by the equation (9), which includes a parallel matrix vector generator 31 and a plurality of parallel vector multiplication operators 32. The circuit structure of the finite-field multiplier is illustrated in FIGS. 4 and 5. The parallel matrix vector generator 31 is primary used to generate a matrix A. The basic circuits for each column are denoted by block 2~block m, which generate the elements in each column of the matrix A, respectively. Similarly, after the matrix A completes the operation, the results are sent to the parallel vector generator 32. Then, the vector values of n-th row of matrix A are operated with the elements in vector B to acquire each element of the vector C. Finally, after all the elements are determined, the vector C is obtained. The difference of this embodiment from the conventional multiplier is that a parallel operation is used in the present invention and only m-1 multiplexers (MUX) are used to determine which bit is required to be shifted out. Therefore, the number of bit in each finite-field element can be determined so that the whole circuit of the multiplier becomes a multiplier circuit with a programmable bit number of finite-field element, and the p(x) can be changed by an external input. The matrix A has a minimum size of 2×2 and a maximum size of m×m. In view of the foregoing, it is known that, in the general finite-field multiplier and the method of the same according to the present invention, the AND gates and XOR gates are primary components, and the input signals includes elements of the matrix A and the vector B and the coefficients of the polynomial p(x). When A, B and the coefficients of p(x) are input, the elements in vector C can be obtained rapidly. The major difference of the present invention from the conventional multiplier is that, in the present invention, the inputs contain multiple bits, and the multiplication operation is performed with multiple bits. Therefore, it is very convenient to be integrated with an existing communication system. Accordingly, the multiplier can be used in an RS chip for different specifications.

Although the present invention has been explained in relation to its preferred embodiment, it is to be understood that many other possible modifications and variations can be made without departing from the spirit and scope of the invention as hereinafter claimed.

What is claimed is:

1. A general finite-field multiplication method for performing A×B=C from finite-field elements A and B and a polynomial p(x) to obtain a finite-field element C, wherein the polynomial p(x) is a primitive polynomial capable of constructing a finite field which defines an element of that is the root of p(x) such that p(α)=0 is met, the method comprising:
   a step of generating a parallel column-based matrix vector for decomposing A into an m×m matrix form by sequentially generating each element in each column of A, wherein the elements have values of A, Aα, Aα² ΛΛα$^{m-1}$, respectively; and
   a step of a parallel column-based vector multiplication operation for directly multiplying each element of each column of the matrix A, that is generated sequentially, with the vector B, and all the multiplication results are accumulated so as to acquire the vector C.

2. The general finite-field multiplication method as claimed in claim 1, wherein in the step of generating a parallel column-based matrix vector, the multiplication operation of two bits is accomplished by an AND operation, and the addition operation is accomplished by an XOR operation.

3. The general finite-field multiplication method as claimed in claim 2, wherein in the step of generating a parallel column-based matrix vector, a latch operation is performed for latching each element in each column of said matrix A, each column in matrix A being generated sequentially, a previous column being shifted with one position upwards for being placed at a lowest position of the column, and a detennination being made whether said shifted element is to be added to an un-shifted element according to the polynomial p(x), so as to generate an element of the next column.

4. The general finite-field multiplication method as claimed in claim 1, wherein in the step of parallel column-based vector multiplication operation, the multiplication operation of two bits is performed by an AND operation, and the addition operation is performed by an XOR operation.

5. The general finite-field multiplication method as claimed in claim 4, wherein in the step of parallel column-based vector multiplication operation, an AND operation is used to obtain a result of said column element in said matrix A multiplying with said vector B, an XOR operation being used to complete the addition operation, a latch operation being used to latch a value after the addition operation, the value being accumulated to a following multiplication value through m times so as to generate said desired C vector, where m is an integral number greater than 1.

6. The general finite-field multiplication method as claimed in claim 5, wherein m is a variable depending on the bit number to be shifted in each column for providing a programmable function.

7. A general finite-field multiplication method for performing A×B=C from finite-field elements A and B and a polynomial p(x) to obtain a finite-field element C, wherein the polynomial p(x) is a primitive polynomial capable of constructing a finite field which defines an element of α that is the root of p(x) such that p(α)=0 is met, the method comprising:
   a step of generating a parallel column-based matrix vector for generating the values of the elements in all columns of said matrix A, wherein the values are A, Aα, Aα² ΛΛα$^{m-1}$, respectively; and
   a step of parallel vector multiplication operation for multiplying matrix A with said vector B when the matrix A is generated, so as to acquire the vector C.

8. The general finite-field multiplication method as claimed in claim 7, wherein in the step of generating a parallel matrix vector, the multiplication operation of two bits is accomplished by an AND operation, and the addition operation is accomplished by an XOR operation.

9. The general finite-field multiplication method as claimed in claim 8, wherein in the step of generating a parallel matrix vector, all elements of a previous column are shifted with one position upwards for being placed at a lowest position, and then a determination being made whether the shifted element is to be added to an un-shifted element according to the polynomial p(x), so as to generate elements of the next column.

10. The general finite-field multiplication method as claimed in claim 7, wherein in the step of parallel vector multiplication operation, the multiplication operation of two bits is performed by an AND operation, and the addition operation is performed by an XOR operation.

11. The general finite-field multiplication method as claimed in claim 10, wherein in the step of parallel vector multiplication operation, an AND operation is used to obtain a result of a row element in said matrix A multiplying with said vector B, and then an XOR operation is used to complete the addition operation of all the results of each row element in said matrix A multiplying with said vector B, so as to generate said vector C.

12. The general finite-field multiplication method as claimed in claim 11, wherein, by changing a bit number of each column to be shifted in each column, a function of programmable bit number of finite-field element is accomplished.

13. A general finite-field multiplier for performing A×B=C from finite-field elements A and B and a polynomial p(x) to obtain a finite-field element C, wherein the polynomial p(x) is a primitive polynomial capable of constructing a finite field which defines an element of α that is the root of p(x) such that p(α)=0 is met, the multiplier comprising:
   a parallel column-based matrix vector generator for decomposing A into an m×m matrix form by sequentially generating each element in each column of A, wherein the elements have values of A, Aα, Aα² ΛΛα$^{m-1}$, respectively; and
   a parallel column-based matrix vector operator for directly multiplying each element of each column of the matrix A, that is generated sequentially, with the vector B, and all the multiplication results are accumulated so as to acquire the vector C.

14. The general finite-field multiplier as claimed in claim 13, wherein the parallel column-based matrix generator performs multiplication operation of two bits by AND gates, and performs an addition operation by XOR gates.

15. The general finite-field multiplier as claimed in claim 13, wherein the parallel column-based matrix vector generator has a latch for latching each element in each column of said matrix A, each column in matrix A being generated sequentially, a previous column being shifted with one position upwards for being placed at a lowest position of the column, and a determination being made whether said shifted element is added to an un-shifted element according to the polynomial p(x), so as to generate an element of the next column.

16. The general finite-field multiplier as claimed in claim 13, wherein the parallel column-based vector multiplication operator performs a multiplication operation of two bits by AND gates, and performs an addition operation XOR gates.

17. The general finite-field multiplier as claimed in claim 16, wherein the parallel column-based vector multiplication operator uses AND gates to obtain a result of said column element in said matrix A multiplying with said vector B, XOR gates being used to complete the addition operation, a latch being used to latch a value after the addition operation, the value being accumulated to a following multiplication value through m times so as to generate said desired C vector, where m is an integral number greater than 1.

18. The general finite-field multiplication method as claimed in claim 17, wherein the parallel column-based vector multiplication operator uses a multiplexer to change the number of bits of each finite-field element.

19. A general finite-field multiplier for performing A×B=C from finite-field elements A and B and a polynomial p(x) to obtain a finite-field element C, wherein the polynomial p(x) is a primitive polynomial capable of constructing a finite field which defines an element of $\alpha$ that is the root of p(x) such that p($\alpha$)=0 is met, the multiplier comprising:

a parallel matrix vector generator for generating the values of the elements in all columns of said matrix A, wherein the values are A, A$\alpha$, A$\alpha^2$ $\Lambda$A$\alpha^{m-1}$, respectively; and a parallel vector multiplication operator for multiplying matrix A with said vector B when the matrix A is generated, so as to acquire the vector C.

20. The general finite-field multiplier as claimed in claim 19, wherein the parallel vector multiplication operator performs a multiplication operation of two bits by AND gates, and performs an addition operation XOR gates.

21. The general finite-field multiplier as claimed in claim 19, wherein the parallel matrix vector generator performs a multiplication operation of two bits by AND gates, and performs an addition operation by XOR gates.

22. The general finite-field multiplier as claimed in claim 21, wherein the parallel matrix vector generator first shifts the elements of a previous column with one upwards for being placed at a lowest position, and then determines whether the shifted element is added to an un-shifted element according to the polynomial p(x), so as to generate an element of the next column.

23. The general finite-field multiplier as claimed in claim 20, wherein the parallel vector multiplication operator uses AND gates to obtain a result of a row element in said matrix A multiplying with said vector B, and uses XOR gates to complete the addition operation of all the results of each row element in said matrix A multiplying with said vector B, so as to generate said vector C.

24. The general finite-field multiplication method as claimed in claim 23, wherein, the parallel vector multiplication operator uses a multiplexer to change the number of bits of each finite-field element.

* * * * *